(12) United States Patent
Chaizy

(10) Patent No.: US 10,347,408 B2
(45) Date of Patent: Jul. 9, 2019

(54) MAGNETIC FIXINGS AND CONNECTORS

(71) Applicant: INELXIA LIMITED, Oxfordshire (GB)

(72) Inventor: Patrick Andre Chaizy, Oxfordshire (GB)

(73) Assignee: INELXIA LIMITED, Oxfordshire (GB)

( * ) Notice: Subject to any disclaimer, the term of this patent is extended or adjusted under 35 U.S.C. 154(b) by 557 days.

(21) Appl. No.: 14/409,688

(22) PCT Filed: Jun. 20, 2013

(86) PCT No.: PCT/EP2013/062948
§ 371 (c)(1),
(2) Date: Dec. 19, 2014

(87) PCT Pub. No.: WO2013/190070
PCT Pub. Date: Dec. 27, 2013

(65) Prior Publication Data
US 2015/0187480 A1    Jul. 2, 2015

(30) Foreign Application Priority Data

Jun. 20, 2012 (GB) .................................. 1210900.5
Sep. 16, 2012 (GB) .................................. 1216514.8
(Continued)

(51) Int. Cl.
*E05B 47/00* (2006.01)
*H01F 7/04* (2006.01)
(Continued)

(52) U.S. Cl.
CPC ........... *H01F 7/04* (2013.01); *A45C 13/1069* (2013.01); *E05B 47/00* (2013.01);
(Continued)

(58) Field of Classification Search
CPC ........ H01F 7/0242; H01F 7/0263; H01F 7/04; A45C 13/1069; E05B 47/0038; E05B 47/0042
See application file for complete search history.

(56) References Cited

U.S. PATENT DOCUMENTS 3,596,958 A    8/1971  Bowerman
4,099,755 A *  7/1978  Anderson ............... E05C 19/16
                                                 292/251.5
(Continued)

FOREIGN PATENT DOCUMENTS

CA    2270785 A1 * 11/2000    ........... H01F 7/1615
CN    202012239 U    10/2011
(Continued)

OTHER PUBLICATIONS

International Search Report, dated Jan. 8, 2014, and Written Opinion issued in International Application No. PCT/EP2013/062948.

*Primary Examiner* — Robert Canfield
(74) *Attorney, Agent, or Firm* — Saul Ewing Arnstein & Lehr LLP

(57) ABSTRACT

A mechanism comprising a first component having a first magnetic part, a second component, and a third component having a second magnetic part, the third component being moveable relative to said first component in a given direction to effect connection and or disconnection of the first and second components by causing interaction of the first and second magnetic parts, wherein, when connected, the first and second components are able to move relative to one another in said given direction. The mechanism further comprising a fourth component for engagement with said first component to prevent movement of the third component relative to the first component as a result of relative movement of the first and second components, thereby to prevent (Continued)

unintended disconnection of the first and second components.

6 Claims, 3 Drawing Sheets

(30) Foreign Application Priority Data

| Dec. 10, 2012 | (GB) | 1222144.6 |
|---|---|---|
| Jan. 14, 2013 | (GB) | 1300551.7 |
| Jan. 14, 2013 | (GB) | 1300555.8 |
| Jan. 14, 2013 | (GB) | 1300638.2 |
| Apr. 16, 2013 | (GB) | 1306870.5 |
| May 26, 2013 | (GB) | 1309452.9 |

(51) Int. Cl.
    *H01F 7/02*      (2006.01)
    *A45C 13/10*     (2006.01)
    *F16B 1/00*      (2006.01)

(52) U.S. Cl.
    CPC ....... *E05B 47/0038* (2013.01); *H01F 7/0242* (2013.01); *H01F 7/0263* (2013.01); *F16B 2001/0035* (2013.01); *Y10T 403/32114* (2015.01)

(56) References Cited

U.S. PATENT DOCUMENTS

| 4,265,002 | A | * | 5/1981 | Hosken | A41F 1/002 |
| | | | | | 24/303 |
| 4,779,314 | A | * | 10/1988 | Aoki | A41F 1/002 |
| | | | | | 24/303 |
| 4,941,235 | A | * | 7/1990 | Aoki | A45C 13/1069 |
| | | | | | 24/303 |
| 5,008,984 | A | * | 4/1991 | Levy | A44C 5/2042 |
| | | | | | 24/303 |
| 5,042,116 | A | * | 8/1991 | Ossiani | A41F 1/002 |
| | | | | | 24/303 |
| 5,092,019 | A | * | 3/1992 | Levy | A44C 5/208 |
| | | | | | 24/303 |
| 5,367,891 | A | * | 11/1994 | Furuyama | A44C 5/2057 |
| | | | | | 24/303 |
| 5,647,101 | A | * | 7/1997 | Morita | A41F 1/002 |
| | | | | | 24/303 |
| 5,675,874 | A | * | 10/1997 | Chen | A41F 1/002 |
| | | | | | 24/303 |
| 5,937,487 | A | * | 8/1999 | Bauer | A41F 1/002 |
| | | | | | 24/303 |
| 6,182,336 | B1 | * | 2/2001 | Bauer | A41F 1/002 |
| | | | | | 24/303 |
| 6,658,697 | B2 | * | 12/2003 | Liao | E05F 5/02 |
| | | | | | 16/82 |
| 7,575,389 | B2 | * | 8/2009 | Nance | E05B 47/0038 |
| | | | | | 403/109.2 |
| 7,843,296 | B2 | * | 11/2010 | Fullerton | G09F 7/04 |
| | | | | | 24/303 |
| 8,368,494 | B2 | * | 2/2013 | Fiedler | A45C 13/1069 |
| | | | | | 269/8 |
| 8,430,434 | B2 | * | 4/2013 | Fiedler | A44B 11/258 |
| | | | | | 292/251.5 |
| 8,434,201 | B2 | * | 5/2013 | Wang | A44C 5/2076 |
| | | | | | 24/303 |
| 8,484,809 | B2 | * | 7/2013 | Fiedler | A45C 13/1069 |
| | | | | | 220/230 |
| 8,739,371 | B2 | * | 6/2014 | Fiedler | A45C 13/1069 |
| | | | | | 24/303 |
| 8,752,252 | B2 | * | 6/2014 | Ninomiya | H01F 7/0263 |
| | | | | | 24/303 |
| 8,794,682 | B2 | * | 8/2014 | Fiedler | A45C 13/1069 |
| | | | | | 24/303 |
| 8,800,117 | B2 | * | 8/2014 | Fiedler | A44B 11/258 |
| | | | | | 24/303 |
| 9,044,071 | B2 | | 6/2015 | Fiedler | |
| 9,307,797 | B2 | * | 4/2016 | Sanchez Giraldez | A41F 1/002 |
| 9,689,527 | B2 | * | 6/2017 | Franklin | F16M 13/02 |
| 9,715,960 | B2 | * | 7/2017 | Chaizy | H01F 7/0242 |
| 2010/0308605 | A1 | | 12/2010 | Fiedler | |
| 2011/0001025 | A1 | | 1/2011 | Fiedler | |
| 2014/0077910 | A1 | * | 3/2014 | Chaizy | H01F 7/0242 |
| | | | | | 335/295 |
| 2015/0187480 | A1 | * | 7/2015 | Chaizy | H01F 7/0242 |
| | | | | | 403/66 |
| 2017/0162312 | A1 | * | 6/2017 | Chaizy | H01F 7/0252 |
| 2017/0301446 | A1 | * | 10/2017 | Chaizy | H01F 7/0252 |

FOREIGN PATENT DOCUMENTS

| DE | 145325 C | 11/1903 | | |
| DE | 10 2007 058 168 A1 | 6/2009 | | |
| DE | 102010044144 B3 | * | 5/2012 | ......... A45C 13/1069 |
| EP | 2994846 A1 | * | 3/2016 | ......... A45C 13/1069 |
| WO | 2009/071071 | * | 6/2009 | |
| WO | 2011029582 A2 | | 3/2011 | |
| WO | 2012/160195 A2 | | 11/2012 | |

* cited by examiner

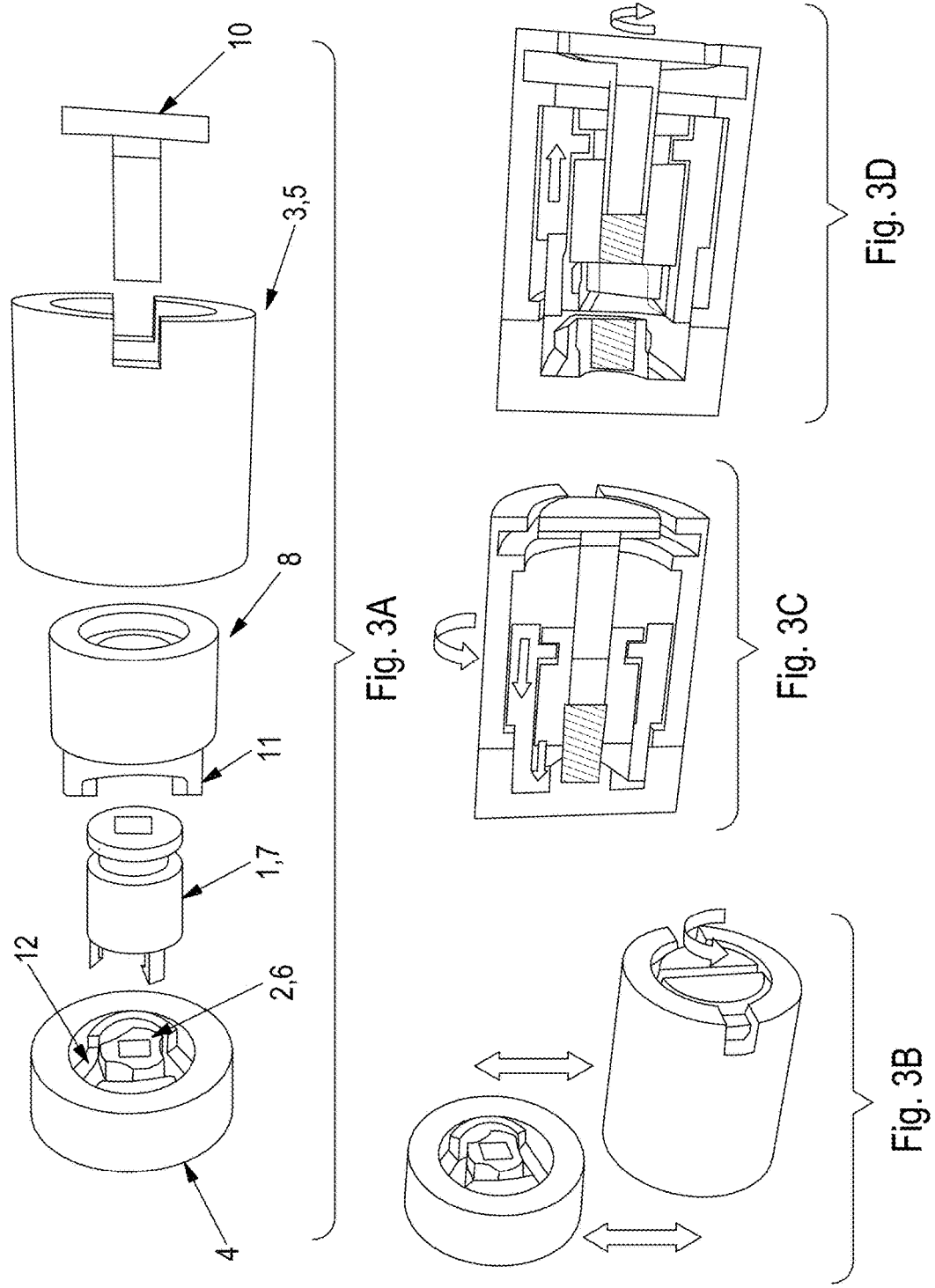

MAGNETIC FIXINGS AND CONNECTORS

CROSS REFERENCE TO RELATED APPLICATIONS

This application claims the priority of PCT/EP2013/062948, filed on Jun. 20, 2013, which claims priority to Great Britain Application Nos. 1210900.5, filed Jun. 20, 2012; 1216514.8, filed Sep. 16, 2012; 1222144.6, filed Dec. 10, 2012; 1300638.0, filed Jan. 14, 2013; 1300555.8, filed Jan. 14, 2013; 1300551.7, filed Jan. 14, 2013; 1306870.5, filed Apr. 16, 2013; and 1309452.9, filed May 26, 2013, the entire contents of each of which is fully incorporated herein by reference.

TECHNICAL FIELD

The present invention relates to magnet fixings and connectors.

BACKGROUND

Various magnetic fixing arrangements are described in the following documents: US2011/001025, PCT/EP2012/059870, DE145325, U.S. Pat. No. 3,596,958

SUMMARY

According to a first aspect of the present invention there is provided a mechanism comprising a first component having a first magnetic part (e.g., a magnet), a second component, a third component having a second magnetic part (e.g., a magnet), the third component being moveable relative to said first component in a given direction to effect connection and or disconnection of the first and second components by causing interaction of the first and second magnetic parts, wherein, when connected, the first and second components are able to move relative to one another in said given direction. The mechanism further comprises a fourth component for engagement with said first component to prevent movement of the third component relative to the first component as a result of relative movement of the first and second components, thereby to prevent unintended disconnection of the first and second components.

The given direction may be a rotational direction. At least one of the magnetic parts may be moveably retained by a guide such that said interaction of the magnetic parts causes a movement of the magnetic part along the guide to a position in which the third component is mechanically secured to the first component. Said first magnetic part may be moveable relative to the first component, under the effect of the second magnetic part, in order to engage said fourth component with said first component. The moveable magnetic part may be moveable in a direction that is substantially parallel or substantially perpendicular to the axis of rotation.

Other aspects of the present invention are set out in the appended claims.

In the first, and other aspects where relevant, the third or fourth component may slide inside or around the first and second components and, when connected to the first component, that third or fourth straddles the first and second component. One of the magnetic parts may slide inside or around the other magnetic part, and the mechanism further comprises a fifth component acting as a guide for the sliding magnetic part such that, when the magnetic parts are engaged, the sliding magnetic part straddles the fifth component and the other magnetic part.

In the first, and other aspects where relevant, there may be provided a further mechanical lock for locking and unlocking the first and third components with respect to one another by said relative motion in the given direction. The mechanical lock may comprises one or more of:
- clip and clip engagement features formed on the first and third components;
- interengaging rails formed on the first and third components;
- further magnetic components moveable in a direction different from a direction in which one of said magnetic parts is able to move.

In the first, and other aspects where relevant, one or more of the magnetic parts may comprise multiple oppositely oriented dipoles.

BRIEF DESCRIPTION OF THE DRAWINGS

FIGS. 3A-3D illustrate a multilayer embodiment

DETAILED DESCRIPTION

Figure 1A:
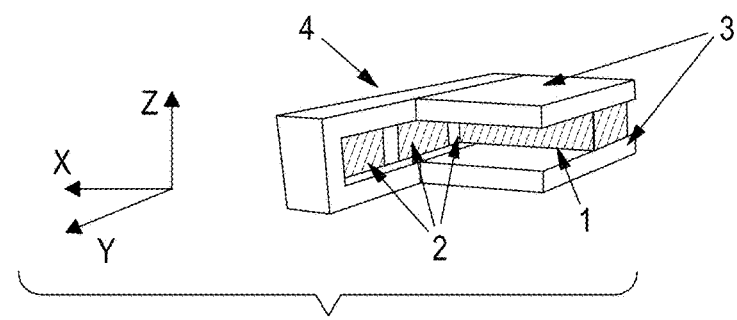
FIGS. 1A and 1B and FIG. 2 illustrate the general principle of prior art linear push-pulls.

Hereafter, the term "push-pull" designates a device that is made of first and second magnetic components moveable with respect to each other, both having magnetic properties so that relative rotational or linear motion (the "actuation motion") causes one of the components (the first magnetic component, or first magnet) to move between a locking position in which that first magnetic component straddles two guides, made of antimagnetic material (i.e. made of a material that is magnetically neutral such as plastic, wood, aluminium etc. . . . ), and an unlocking position in which the first magnetic component does not straddle the two guides. This straddling mechanically prevents the two guides from moving in a folding motion or in a motion that is not parallel to the direction of motion of the first magnetic component when it moves from a locking to an unlocking position. Hereafter, this latter motion of the first magnetic component is called the "locking/unlocking motion".

Such push-pulls offer various advantages such as aesthetics (e.g. the mechanisms can be totally hidden from view), haptic, rapidity/simplicity of use, safety, cost reduction (e.g. by reducing structure assembling/disassembling times), entertainment, novelty/fashion, improve quality, etc. The trade domains that can benefit from such push-pulls devices include toys, furniture, bathroom equipment, boxes (e.g. jewelry cases), bags, clasps, scaffolding, building frames, panel frames, item holders, fastening devices, lifting or pulling mechanisms etc. . . . . The mechanical strength that prevents the guides from moving relatively to each other's, in a sheer or folding motion, is a function of the material that is used to straddle the guides. This material can be the material that is used to make the magnet. It can also be the one that is attached to the magnets (e.g. to wrap the magnets) and that moves with the magnets. Thus "magnetic component" designates both the magnet(s) and their surrounding material.

All push-pulls described in this document can be manufactured first and, later, be integrated (e.g. screwed, glued etc. . . . ) into other parts; they can be bespoke or standardised and potentially sold in shops as standalone products. They can also be manufactured at the same time as the other parts so that no later integration is required. The magnetic force can be used only to lock or to unlock the system (as opposed to lock and to unlock the system). In that latter case, an additional force is required to unlock or lock the system, respectively. This additional force can be the same force as the one used by the actuation motion or a separate one. If a separate force is used then the latter must be strong enough to move the first magnetic component from the locking (unlocking) position to the unlocking (locking) position yet weak enough not to prevent the magnetic force between the two magnetic components from moving the first magnetic component from its unlocking (locking) position to its locking (unlocking) position. This means that the actuation motion of the two magnetic components only needs to modulate the magnitude of the magnetic force, i.e. not its direction. This separate force can be generated by a spring or by another magnet/paramagnetic material acting as a spring.

If the actuation motion force is used then the locking/unlocking motion of the first magnetic component is mechanically actuated. This means that first magnetic component, second magnetic component (also referred to as the second magnet), and guides, are shaped so that the actuation motion will move the first magnetic component on sections of a guide and/or second magnetic component that are inclined so that the actuation motion results in an increase of the distance between the two magnetic components (e.g. see FIG. 2 for a linear motion). In that case the magnetic force does not have to be modulated or its direction reversed.

The magnetic properties of the two magnetic components depend on whether the magnetic force needs to be modulated or its direction changed. If the magnetic force direction is reversed then the two magnetic components can both comprise magnets with an adequate orientation of their magnetic poles. Alternatively, one component contains a magnet and the other one a patchwork of paramagnetic and diamagnetic materials. If the force is merely modulated then, typically, one component can contain a magnet and the other one a patchwork of paramagnetic and antimagnetic materials. Note that a paramagnetic material is only attracted when in the presence of an externally applied magnetic field, that a diamagnetic material is repelled by magnetic fields, and that an antimagnetic material is impervious to the effect of a magnetic field.

Linear actuation motion means that to unlock the push-pull, first magnetic component slides linearly relatively to second magnetic component and parallel to an orientation that is not parallel to the locking/unlocking motion orientation. Rotational actuation motion designates a linear actuation motion with a first magnetic component path wrapped around an axis that is not parallel to the linear actuation motion orientation. This wrapping axis becomes the axis of rotation and, depending on the embodiments, can go or not through first magnetic component.

Hereafter, the terms "parallel rotational" and "perpendicular rotational" refer to rotational push-pulls where the rotational axis is, respectively, parallel and not-parallel to the locking/unlocking motion direction. Note that for parallel rotational push-pulls, the ability of the first magnetic component to rotate relatively to guide can be a function of its linear position along guide as illustrated in FIG. 13 of PCT/EP2012/059870. The guiding can be "internal", "external" or "mixed" for both linear and rotational actuation motions. The guiding is said to be "internal" if the guide penetrates, partially or totally, one or both of the two magnetic component(s). It is said to be "external" if the magnetic component penetrates, partially or totally, the guide. The guiding is said to be "mixed" if it is internal on a section of the first magnetic component path and external on another section; see PCT/EP2012/059870 for examples of internal, external and mixed guiding for rotational push-pulls.

In addition, one or both of the two magnetic component(s) may or may not slide relatively to the guide(s) during the execution of the actuation motion. In all of the accompanying figures the following convention is used: the surfaces of the guides and of the parts are totally or partially white while the surfaces of the material with magnetic properties are all black.

Figure 1B:
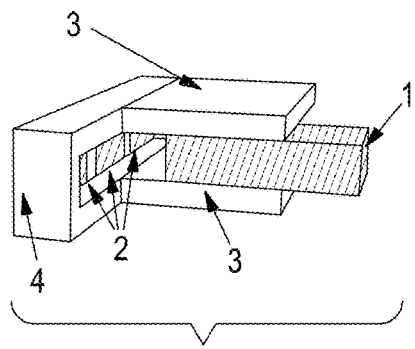
Figure 2:
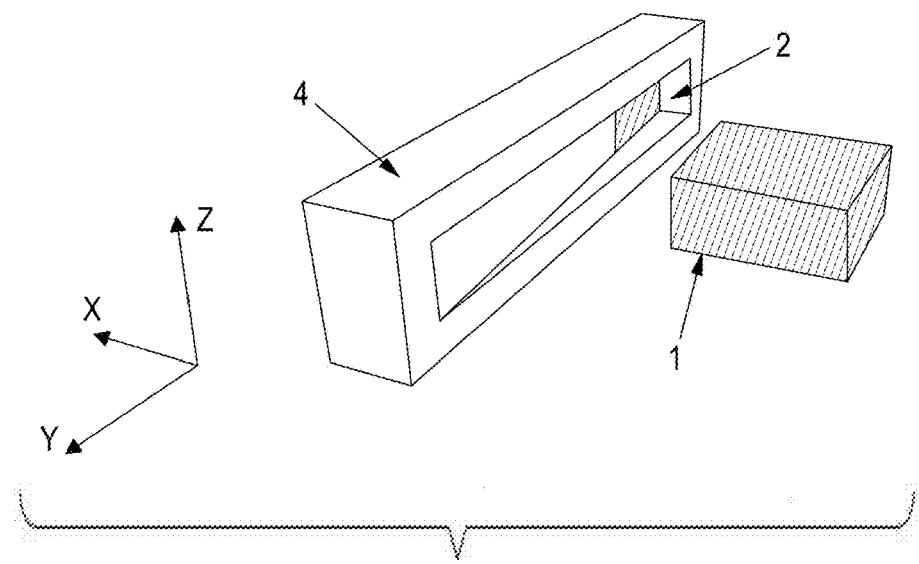

In order to aid in understanding the present invention, reference is now made to FIGS. 1A and 1B and 2 (wherein like numbers enumerate like parts) even though these Figures do not embody the invention. FIGS. 1A and 1B illustrate the known principle of a linear push-pull (i.e. a push-pull with a linear actuation motion). The linear actuation and locking/unlocking motions of the first magnetic component are, respectively, parallel to the Y and X directions. Guide contains at least 2 magnets. The orientations the magnetic dipoles of all the magnets are parallel to first magnetic component, i.e. to the X direction. However, the directions of the magnetic dipoles inside guide, alternate along the Y direction. Thus, in FIG. 1A the push-pull is locked. In FIG. 1B the first magnetic component has moved in the Y direction and is now in front of second magnetic component which has a magnetic dipole direction opposite to the previous one. Therefore the first magnetic component is now pushed away from second magnetic component and the push-pull is unlocked; i.e. guides can now move parallel to the Z orientation in opposite directions. Note that, in this illustration, guide does not move relatively to guide in the Y direction during the actuation motion although it could; only first magnetic component does.

Note also that other magnetic configurations producing the same inversion of the magnetic force as a result of a linear actuation motion of the first component are possible. For instance, the orientation of the magnetic dipoles of magnetic components could be perpendicular to the locking/unlocking orientation.

In FIG. 2, in contrast to FIGS. 1A and 1B, the magnetic force direction is not reversed and the additional force is the actuation motion force. This can be seen by the bevelled shape of the channel and of the surface of the first magnetic component of which normal has one of its vector components in the Y direction. The first magnetic component is attracted by second magnetic component if left free to position itself. During the actuation motion the first magnetic component is moved along the +Y axis. As a result, the bevelled shape pushes the first magnetic component outside guide; for simplicity guide has not been represented in FIG. 2.

The term Multi-Layers Push-pull designates a system made of at least four parts (or "components"). If a first part, hereafter called the sliding part, moves relatively to a second part, hereafter called the reference part, then the sliding part can also move by friction a third part, hereafter called the dragged part, in the same direction as its direction of motion. To prevent this, a fourth part, hereafter called the additional part, which cannot be dragged by friction by the sliding part, is inserted between the sliding part and the dragged part. Such an additional part acts as a mechanical isloation layer between the sliding and the dragged parts. Some of these four parts can be the first magnetic component, second magnetic component, guide(s) of a push-pull of any kind. In that case, additional part will prevent unwanted locking/ unlocking of the push-pull. Indeed, reference part and dragged part can be, for instance, magnetic components of any kind of push-pull. Consequently, if the orientation of the motion of sliding part is identical to the orientation of the actuation motion, and if additional part is absent, then, through friction, the motion of sliding part can trigger a relative motion of magnetic components parallel to the actuation motion orientation thus potentially resulting in a unwanted locking/unlocking of the push-pull. Note that the issue is the same if dragged part is a guide relatively to which first magnetic component cannot slide parallel to the actuation motion. The sliding part can be, for instance, guide(s) and/or.

In FIGS. 3A-3D, the following configurations are shown:

A an exploded view of all the independent parts,

B the relative motion of the assembled parts relatively to each other's

C,D and two cross sections of the system showing the transition of the first magnetic component (7) and of sliding part (5) from a locked to an unlocked push-pull configuration.

Note that in FIGS. 3A-3D additional part (8) can rotate relatively to sliding part (5) but not to reference part (6), because of the protrusion (11) that penetrates the recess (12). Such a shaping of additional part (8) and of reference part (6), so that when the push-pull is locked the two parts are mechanically coupled, is a typical way of preventing additional part (8) to be dragged by friction by sliding part (5). Note that when sliding part (5) is also a guide then first magnetic component (7) can but does not have to straddle guides (5) and (4) as long as additional part (8) straddles guides (5) and (4); i.e. additional part (8) becomes an extension of first magnetic component (7).

In some circumstances, it can be required to be able, on request, to mechanically couple sliding part (5) and dragged part (7) so that dragged part (7) moves with sliding part (5). Indeed, in FIG. 12, first magnetic component (7) is rotatable because one of its extremities is accessible (e.g. to a screwdriver).

For the sake of clarification, FIGS. 4A-4D illustrates again the multilayer embodiment of FIG. 3, but with an alternative numbering system. The following description of the embodiment will be helpful in understanding the embodiment.

Figure 4A:
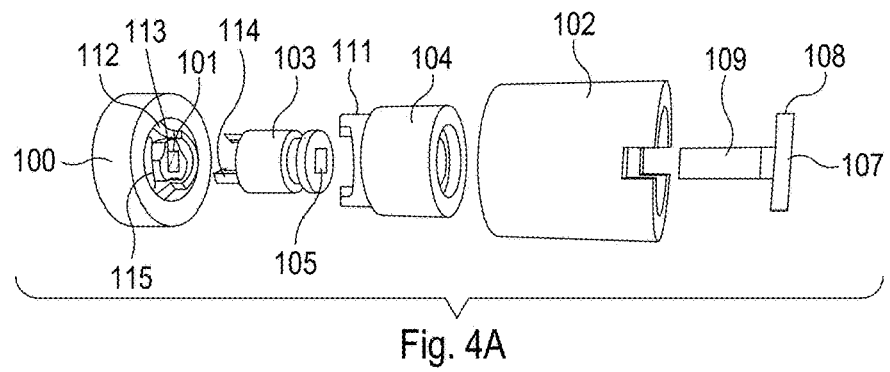
FIGS. 4A-4D illustrate the multilayer embodiment of FIGS. 3A-3D, but grouped differently.

The illustration in FIG. 4A is an exploded view of the embodiment. It illustrates five components 100, 102, 103, 104, and 107, namely a fixed first component 100, e.g. which might be fixed to a wall, having a first fixed magnet 101. This first magnet 101 is located within a recessed socket 113, with the magnet 101 being fixed within the socket 113. A second component 102 is a hollow cylinder configured to accommodate a third component 103 and a fourth locking component 104, where the locking component 104 is also cylindrical and is located, substantially coaxially, between the second and third components 102 and 103. The third component 103 comprises a central passage 105 having a generally square cross-section. A second magnet 106 is secured within this passage 105.

Figure 4B:
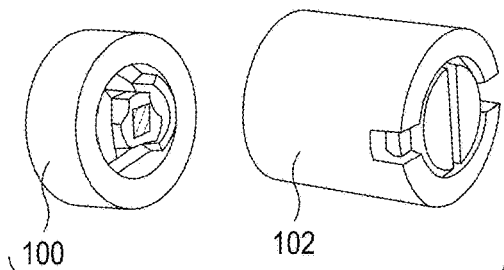
Figure 4C:
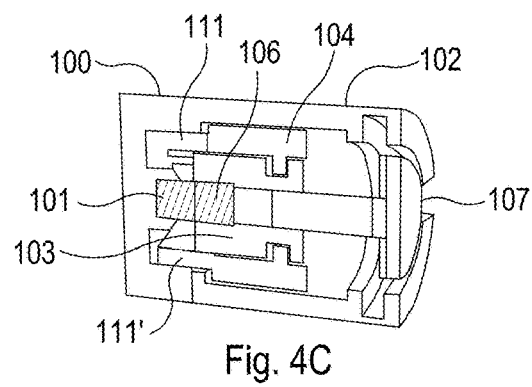
Figure 4D:
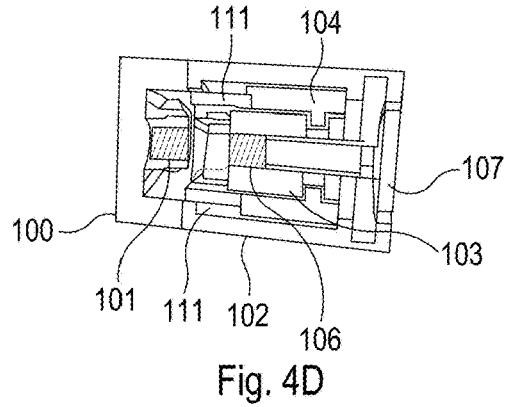

FIG. 4B illustrates fixed first component 100 in the separated position from second component 102. FIG. 4C is a cross-sectional perspective view of this embodiment in the locked position (magnets 101 and 106 magnetically coupled to each other) and FIG. 4D is a cross-sectional view of this embodiment in the unlocked position (magnets 101 and 106 magnetically repelling each other).

Referring to FIGS. 4A-4D, this embodiment comprises a fifth component 107 having an enlarged head 108 and a shaft 109 have a square cross-section such that the shaft can be located within the passage 105 of the third part. Rotation of the fifth component 107 therefore results in rotation of the third component 103 relative to the first component 100. The first and second magnets 101 and 106 each comprise a single dipole magnet, the magnetic axes being aligned perpendicular to the rotational axis of the first and second components.

The second, third, fourth and fifth components are assembled into a single unit 110 that can be engaged with the first component 100. When the assembled unit and the first part are brought together, a pair of lugs 111 projecting from the end of the fourth component 104 locate within respective recesses 112 formed in the first component 100. The engagement of the lugs with the recesses prevents the fourth component 104 from rotating relative to the first component 100 because they physically block such movement when so engaged. By rotating the head of the fifth component 107, a user is able to rotate the third component 103 relative to the first component 100 (and the fourth component 104). This action can be used to align the magnetic dipoles of the magnets 101, 106 such that a magnetic attraction occurs. As a result, the second magnet is pulled towards the first magnet 101, in turn pulling the third component 103 towards and into engagement with the first component 100. The third component slides in the fourth component 104 during this step.

In order to prevent the assembled unit 110 being pulled away from the first component 100, overcoming the magnetic attraction force, a set of latches 114 project from the end of the third component 103 and penetrate into a generally circular recess 115 formed in the first component 100. Rotation of the third component 103 causes these latches to locate behind respective lips formed around the circumference of the recess 115, preventing the assembled unit from being pulled away from the first part (the lips engage with the latches 114).

In this configuration, as has already been noted, the fourth component 104 cannot rotate relative to the first component 100. However, the second component 102 is free to rotate around the fourth component 104. Moreover, the third component 103 can be rotated in a counter-direction in order to rotate the second magnetic component 106 and release the latches 114 from behind the holding lips. Such rotation will cause a repulsion of the two magnets, allowing the assembled unit 110 to be removed from the first component 100.

It will be apparent that the advantage of the embodiment of FIGS. 4A-4C is that the fourth component 104 effectively decouples the second component 102 from the third component 103. Rotation of the second component 102 has no effect on the third component 103 and in particular will not cause any rotation, and therefore release of, the third component 103 from the first component 100.

A modification to this mechanism replaces the recesses 115 with recesses that are configured to snap-in the latches 114 during attachment of the unit 110. The mechanism is such that, as the unit is brought into close proximity with the first component 100, the magnetic parts self-align, rotating the third component 103 to a position in which the latches 114 are properly aligned with the recesses. The magnetic force is sufficient to pull the third component 103 towards the first component 100, causing the latches 114 to snap into place behind respective lips. When the third part is subsequently rotated to a position in which the magnets are mis-aligned and the latches are no longer caught by the lips, the repulsion force pushes the third and first components 103 and 100 apart.

The invention claimed is:

1. A mechanism for coupling a first and a second component together so that the components are movable relative to one another in a given direction when coupled, the mechanism comprising said first component having a first magnet and said second component, the mechanism further comprising:
   a third component having a second magnet, the third component being moveable relative to said first component in said given direction to effect connection and or disconnection of the first and second components by causing interaction of the first and second magnets; and
   a fourth component for mechanically interlocking engagement with said first component so that the first and fourth components cannot move relative to one another in said given direction, and the fourth component being located between said second and third components, the fourth component thereby isolating the second component from the third component to prevent movement of the second component in said given direction being transferred to said third component, thereby preventing unintended disconnection of the first and second components.

2. A mechanism according to claim 1, wherein said given direction is a rotational direction.

3. A mechanism according to claim 1, wherein at least one of the magnets is moveably retained by a guide such that said interaction of the first and second magnets causes a movement of one of said first and second magnets along the guide to a position in which the third component is mechanically secured to the first component.

4. A mechanism according to claim 1 and comprising a further mechanical lock for locking and unlocking the first and third components with respect to one another by said relative motion in the given direction.

5. A mechanism according to claim 1, wherein said fourth component is secured to said second component such that said second component can move relative to said fourth component in said given direction.

6. A mechanism according to claim 1, wherein said first and fourth components comprising interengaging mechanical features for preventing relative movement in the given direction.

* * * * *